(12) United States Patent
Chudley et al.

(10) Patent No.: US 8,721,412 B2
(45) Date of Patent: *May 13, 2014

(54) SYSTEM AND METHOD CONFIGURED TO UNLOCK CONTENT WITHIN A VIDEOGAME

(71) Applicant: Activision Publishing, Inc., Santa Monica, CA (US)

(72) Inventors: Martyn Richard Chudley, Knutsford (GB); Craig Howard, Manchester (GB); Paul Kerby, Lancashire (GB); Gareth George Wilson, Knutsford (GB); Gerard-Lee Talbot, Liverpool (GB); Ben James Ward, Liverpool (GB)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,106

(22) Filed: Aug. 12, 2013

(65) Prior Publication Data

US 2013/0337911 A1      Dec. 19, 2013

Related U.S. Application Data

(63) Continuation of application No. 12/481,812, filed on Jun. 10, 2009, now Pat. No. 8,506,372.

(60) Provisional application No. 61/154,300, filed on Feb. 20, 2009.

(51) Int. Cl.
*A63F 9/24* (2006.01)

(52) U.S. Cl.
USPC .................................................. 463/6; 463/42

(58) Field of Classification Search
USPC ........................ 463/6, 8, 25, 42; 700/92; 703/8
See application file for complete search history.

(56) References Cited

U.S. PATENT DOCUMENTS

| | | | |
|---|---|---|---|
| 6,763,273 B2 * | 7/2004 | Chudley et al. | 700/93 |
| 6,763,325 B1 * | 7/2004 | Stone | 703/8 |
| 7,260,560 B2 | 8/2007 | Herbrich et al. | 706/45 |
| 2004/0224741 A1 * | 11/2004 | Jen et al. | 463/6 |
| 2004/0224742 A1 * | 11/2004 | Chudley et al. | 463/6 |
| 2004/0266506 A1 * | 12/2004 | Herbrich et al. | 463/6 |
| 2005/0148388 A1 | 7/2005 | Vayra et al. | 463/32 |
| 2006/0030407 A1 | 2/2006 | Thayer | 463/42 |
| 2006/0035692 A1 | 2/2006 | Kirby et al. | 463/6 |

(Continued)

OTHER PUBLICATIONS

Gran Turismo the Real Driving Simulator, Sony Computer Entertainment, Oct. 16, 2007, 50 pages.
Gran Turismo 4, Sony Computer Entertainment, Dec. 27, 2004, 2 pages.
Grand Theft Auto III, Rockstar Games, 14 pages.

(Continued)

*Primary Examiner* — Dmitry Suhol
*Assistant Examiner* — Jason Yen
(74) *Attorney, Agent, or Firm* — Pillsbury Winthrop Shaw Pittman LLP

(57) ABSTRACT

A system and method are configured to provide a videogame to one or more players. The videogame may involve a series of different sets of content within which players perform activities. A group of players may be associated with the content sets. The players may include virtual players controlled by artificial intelligence and one or more real world players. Players may progress through the videogame by moving from content sets to content sets, performing objectives in the various content sets, and interacting with the players within those content sets.

16 Claims, 3 Drawing Sheets

(56) References Cited

U.S. PATENT DOCUMENTS

| | | | |
|---|---|---|---|
| 2006/0148546 A1 | 7/2006 | Inoue et al. | 463/6 |
| 2007/0066403 A1 | 3/2007 | Conkwright | 463/43 |
| 2007/0117615 A1* | 5/2007 | Van Luchene | 463/25 |
| 2007/0149288 A1* | 6/2007 | Nickell et al. | 463/42 |
| 2007/0149290 A1* | 6/2007 | Nickell et al. | 463/42 |
| 2007/0191101 A1 | 8/2007 | Coliz et al. | 463/42 |
| 2009/0163272 A1 | 6/2009 | Baker et al. | 463/29 |

OTHER PUBLICATIONS

Ivan Sulic, NASCAR 06: Total Team Control, IGN, http://ps2.ign.com/articles/647/647323p1.html, Sep. 1, 2005, 4 pages.

Nintendo, Mario Kart Instruction Booklet, 2008, 34 pages.

Answers.com, NASCAR 06: Total Team Control, http://www.answers.com/topic/nascar-06-total-team-control, 2005, 5 pages.

Wikipedia, Chase for the Sprint Cup, http://web.archive.org/web/20090805053316/http://en.wikipedia.org/wiki/Chase_for_the_Nextel_Cup, 3 pages.

* cited by examiner

SYSTEM AND METHOD CONFIGURED TO UNLOCK CONTENT WITHIN A VIDEOGAME

CROSS-REFERENCE TO RELATED APPLICATIONS

The present application claims priority from U.S. patent application Ser. No. 12/481,812, filed Jun. 10, 2009, which claims priority from U.S. Provisional Patent Application No. 61/154,300 filed Feb. 20, 2009, entitled "System and Method Configured To Provide A Location-Based Vehicular Racing Videogame," which is expressly incorporated by reference herein for all purposes. The present application is related to pending U.S. Utility patent application Ser. No. 12/390,272 filed Feb. 20, 2009, entitled "Social Network System and Method For Use With and Integration into a Video Game," which is expressly incorporated by reference herein for all purposes.

BACKGROUND OF THE INVENTION

1. Field of the Invention

The invention relates to a location-based videogame in which a player must participate in sets of events held at different virtual geographic locations. The order in which locations and events may be unlocked and accessed may be controlled somewhat by players.

2. Background of the Invention

Vehicular racing videogames are known. Other types of videogames in which content is divided up into separate virtual locations are known. Generally the manner in which content within these videogames is presented to players is somewhat rigid, and even if optional or tangential content is included a predetermined set of tasks must be accomplished in a predetermined order to complete the game.

SUMMARY

One aspect of the invention relates to a system and method for providing a videogame to one or more players. The videogame may involve a series of different virtual geographic locations at which players perform activities. A group of players may be associated with each location. The players may include virtual players controlled by artificial intelligence and one or more real world players. Players may progress through the videogame by moving from location to location, performing objectives at the various locations, and interacting with the players at the locations.

Access to all of the different locations may not be provided initially to a real player. In some implementations, locations may be associated with predetermined criteria. The real player may be provided with a given location once the real player has fulfilled the predetermined criteria associated with the given location. The criteria may include the performance of tasks and/or the successful completion of events at one or more locations open to the real player. This may provide the real player some flexibility with manner in which the real player experience and/or interacts with the content within the videogame.

As used herein, the term "location" may refer to virtual locations depicted within the videogame as separate geographic locations. The different locations may based on and/or modeled after real world geographic locations. A location within the videogame modeled after a real world geographic location may include landmarks that are the same as or similar to real world landmarks of the real world geographic location, terrain that is similar to the real world geographic location, flora and/or fauna similar to the real world geographic location, and/or depict other features of the virtual location that are similar to the real features of the real world location. One or more locations may be purely fictional, or based on an aggregation of a plurality of real world geographic locations.

One aspect of the invention relates to a system configured to provide the videogame to one or more real players. The system may include a game platform configured to execute one or more computer program modules to generate sensory stimulation for the one or more players that is associated with the videogame. The game platform may include a gaming console, a portable gaming console, a personal computer, a handheld device, a mobile communications device, and/or other processing platforms. The one or more computer program modules implemented by the game platform may include a game module, a location module, an event module, a virtual player control module, and/or other modules.

The game module may be configured to control the game platform to generate a display, sounds, and/or haptic stimulation for the player that mimics the visual, audio, and/or tactile stimulus experienced by real players during the videogame. For example, if the videogame is a racing videogame, the game module may be configured to control the generation of sensory stimulation that mimics the sensory stimulation experienced during vehicular racing in real life.

The location module may be configured to manage the separate virtual geographic locations within the videogame. This may include storing, organizing, and/or managing information that enables the game module to render scenes associated with the separate locations, generate sensory stimulation associated with events (e.g., races) that occur at the separate locations, and/or other information related to the locations. The location module may store, organize, and/or manage information related to associations between individual locations and groups of virtual players that are associated with the individual locations.

As was mentioned above, a real player that begins the videogame may not be provided with access to all of the virtual geographic locations. Locations that are not initially available to the real player may be unlocked for, or made accessible to, the real player upon the fulfillment of predetermined criteria associated with individual ones of the locked, or inaccessible, locations. The predetermined criteria may include the performance of tasks and/or successful participation in events within one or more locations that are unlocked for the real player. The location module may monitor the activities of the real player within the videogame to determine whether the real player has fulfilled the predetermined criteria associated with one or more locked locations. If the real player has fulfilled such predetermined criteria, the location module may unlock the appropriate locations to provide the real player with access.

The location module may initially provide access for a real player to only a single, initial location. The location module may proceed to unlock other ones of the locations in the game as the player fulfills the criteria associated with the locked locations. The location module may be configured to provide real player with some control over the manner in which they access the locked locations. For example, a given unlocked location may include content that enables a real player may fulfill criteria associated with two or more locations. By performing the appropriate tasks and/or events, the real player may select which locations are unlocked and/or the order in which the unlocked locations are unlocked.

Similarly, a given locked location may be by the location module such that it can be unlocked by different sets of criteria. For example, the locked location may be associated with a first set of criteria and a second criteria, either of which can be fulfilled for the location module to unlock the locked location. The first set of criteria may include the performance of tasks and/or successful participation in events within a first unlocked location. The second set of criteria may include the performance of tasks and/or successful participation in events within a second unlocked location. As such, the location module may define a plurality of different possible paths through the videogame to unlock the various locations.

The division of the content of videogame into the different locations, with different story paths to the various locations, may enhance the realism of the videogame, and/or may provide real players with some control over the narrative of the overall game. By way of non-limiting example, the division of content into separate geographic locations may mimic the manner in which underground, unsanctioned racing might occur in the real world (e.g., localized racing scenes along predetermined roadway courses). For instance, the videogame may progress from rural, unpopulated racecourses where interference from bystander traffic and/or law enforcement would be unusual to more metropolitan locations where spectators and racers appear unannounced en masse to block off roadways and create racecourses may mimic the viral manner in which information and interests spread in the modern world.

For example, the locations managed by the location module may include an initial location available to real players upon entering the videogame that includes stretches of road that are largely unused (e.g., a remote, sparsely populated area), thereby lending themselves to informal races between friends. The races conducted by at the initial location may make for exciting videos (e.g., machinima of races participated in by the real player at the initial location), and the videogame may include players making and selecting video footage for dissemination over the Internet (within the videogame). Once the video footage of the initial location reaches a wider virtual audience within the game, word spreads and the racing scene begins grow.

Inspired by video from the initial location, rival racing hotspots (e.g., other locations managed by the location module) begin to emerge. These rival locations may include, at first, areas that are geographically close to the initial location, and then become more and more distant. The location module may enable players to travel from location to location in order to prove themselves within local communities (e.g., the groups of players) at the individual locations, and/or to the national or international community as a whole.

As the videogame progresses, the locations managed by the location module that become accessible to a player may be less isolated. The races held at these more metropolitan locations may be more notorious than the isolated races at the initial location.

As was mentioned above, a player may somewhat control the manner in which the various locations managed by the location module are unlocked within the videogame. This may enable the player to determine his own "career path" within the game (e.g., through the general story arc outlined above).

The location module may enable a real player to unlock a location without completing a preceding location. This may further enable the real player to leave the preceding location for the newly unlocked location without completing the preceding location. The location module may enable the real player to return to the preceding location at his discretion to complete the content associated therewith.

As used herein, a player may be considered to have "completed" a location by successfully performing one or more final tasks and/or events. Completion of a location does not necessarily refer to the performance of all possible tasks and/or events, or even all of the tasks and/or events that can be participated in to move the plot of the videogame along.

The event module may be configured to manage events within the videogame at the various locations. This may include storing the requirements of the events for success, providing the player access to previously locked events at a location, and monitoring the performance of the player within events to determine if the player has been successful. If the videogame is a racing game, the events may include vehicular racing competitions and/or other demonstrations of driving or racing skills.

For a given location, the event module may manage a plurality of events. Each event may include a race, or some other competitive demonstration of racing skill(s). When a player first accesses a location, a preliminary set of the events at the location may be accessible to the player. The preliminary set of events may be a subset of the events associated with the location. To gain access the other events associated with the location, the player may have to fulfill predetermined criteria associated with the other events. The predetermined criteria may include, for example, successful performance of one or more of the preliminary set of events. The event module may monitor the performance of the player within the preliminary set of events to determine if the other events should be unlocked (e.g., based on comparison between the player's performance and predetermined criteria).

Successful performance in an event may or may not include "winning" an event. In addition to, or instead of, winning an event, successful performance in an event may require achieving one or more predetermined goals in the event. The predetermined goals may be conveyed to the players prior to the event.

The event module managing the events at a given location may not dictate to the player the order in which the player performs unlocked events. Since not all of the events at a given level may be required for the event module to provide access to a next set of events (or event), the event module may not dictate to the player which portion of the content within the game the player must access in the course of successfully accomplishing the videogame. This may enhance the gaming experience with the videogame, as players may control to some extent the order in which videogame content is experienced, and the particular tasks that are performed that contribute to finishing the videogame. While conventional videogame systems, such as videogame systems providing vehicular racing videogames, may provide content with tasks and/or events that are optional, players typically progress through the game toward completion by completing all of a predetermined set of "plot moving" tasks and/or events, in addition to interactions with the optional content.

The event module may manage final events for the locations within the videogame. To complete a location the location module may require a player to successfully participate in a final event associated with the location. Success or failure in the final event may be determined by the event module. Within the narrative of the videogame, completing the final event of a location may be commemorated with a special reward or incentive. The special reward or incentive may include, for example, a bonus of points, experience points, and/or virtual currency. The special reward may include, for example, an insignia, a badge, or a patch that can be worn on a representation of the player or a representation of a car driven by the player indicating that the player has completed the location. Completion of all the locations, or some predetermined number of the locations, by completing the final events at the locations may be required before the grand finale of the videogame is accessible to the player.

The virtual player control module may be configured to control the virtual players within the game. As such, the virtual player control module may include artificial intelligence that controls the actions of virtual players within the game. The virtual players may include players that real players compete against in the videogame (e.g., in events), characters that observer or facilitate the events in the videogame (e.g., spectators, equipment or vehicle vendors, mechanics). The virtual player control module may control the actions of the virtual players in the events within the game, in other contexts within the game, and/or other interactions of the virtual players with real players.

The interactions of the virtual players with a real player may be influenced by relationships of the real player with the different virtual players. The relationships may be dynamically and adaptively determined by the virtual player control module (e.g., they can change automatically over time). For example, the relationships may be determined based on interactions between the real player and the virtual players within the videogame (and/or outside of the videogame). Interactions toward a virtual player by the real player that are hostile or aggressive may result in the virtual player having a hostile or combative disposition or attitude toward the player. Similarly, interactions toward a virtual player by the real player that are felicitous may result in the virtual player having a friendly or cooperative disposition or attitude toward the real player.

The relationships between virtual players and the real player may impact the videogame in that virtual players that are friendly or cooperative toward the real player may help the real player be successful in completing events, while virtual players that are hostile toward the real player may actively hinder the real player from being successful in events.

Virtual players may be the keepers of information related to events and/or locations. This information may unlock events and/or locations, or may provide guidance to the real player as to how to be successful within the context of an event or location. If the real player has a hostile relationship with a virtual player that is the keeper of information related to an event or location, the virtual player control module may control the virtual player to withhold the information. If the real player has a friendly relationship with a virtual player that is the keeper of information related to an event or location, the virtual player control module may control the virtual player to provide the information to the real player. The real player may then implement the information to access the previously locked content, be successful at an event or location, or otherwise implement the information.

Each location within the videogame may have a group of virtual players that are associated therewith by the location module. The group of virtual players associated with a given location may have one or more traits that are consistent with the virtual geographic setting of the given location, the place in the narrative of the videogame of the location, and/or other features of the given location. For example, in locations that are accessible to a real player early in the narrative of the racing game described above, the groups of virtual players may include tightly knit groups of friends that convene to race in remote, isolated locales for the thrill and adrenaline rush. However, as the real player proceeds through the videogame to locations that are cosmopolitan, the publicity, acclaim and rewards associated with the covert racing provided by the videogame may become more prevalent. As such, the virtual players associated with these locations may be have different motivations than the virtual players experienced early on in the game, and may be less friendly and more aggressive. Similarly, racing tactics employed by the virtual players associated with later locations may be more cutthroat and dangerous.

The groups of virtual players associated with the locations within the game may each have its own social structure. Players, including virtual and real players, may move up and down in status within the group based on one or more of their performance within events, their virtual possessions, their relationships (e.g., friendships and rivalries), and/or other socially significant acts, items, and/or traits. The virtual player control module may determine the relative status of the players associated with a given location, including a real player playing the videogame and the virtual players associated with the given location.

Progression through the videogame by unlocking content at a location may require more than success in the events associated with the location. Unlocking content at the location (e.g., the criteria associated with locked events and/or locations) may require a real player to progress socially within the group of virtual players associated with the location, as determined by the virtual player control module. In some cases, to complete a location a real player much increase status within the group until the player is determined by the virtual player control module to be the "leader" of the group.

The group of virtual players associated with a location within the videogame may include different types of virtual players. These types of virtual players may include a boss type of virtual player, a nemesis type of virtual player, and/or other types of virtual players. A boss type of virtual player may be the leader of the group. Completion of a location may require the real player to defeat the boss virtual player of the location in the final event of the location. A nemesis type of virtual player may include a virtual player within the group that is attempting to perform the same set of tasks as the real player, and competes directly with the real player throughout the events associated with the location. The nemesis may also compete for resources at the location (e.g., cars, equipment, friendships with other characters) with the real player. Success within one or more events at the location may be judged based on performance relative to the nemesis real player at the location.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
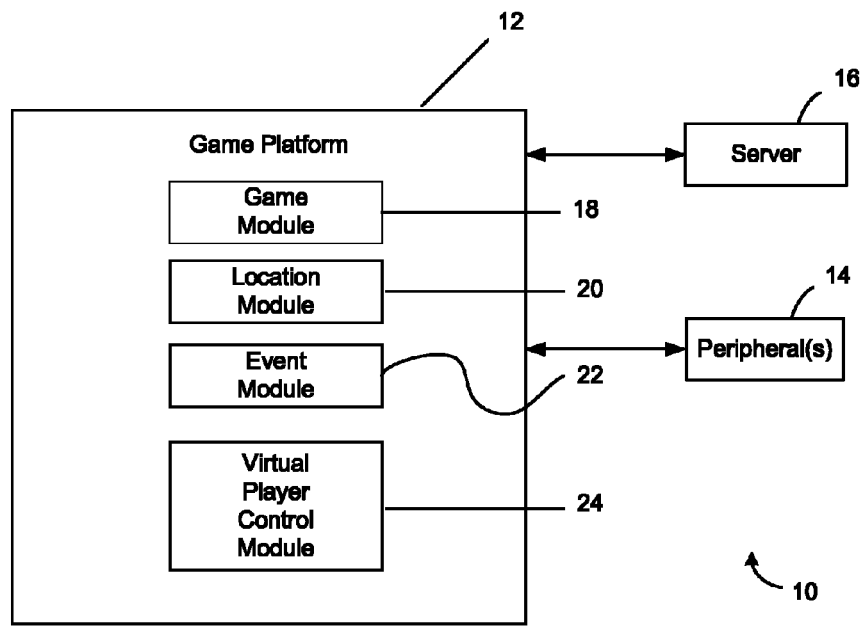
FIG. 1 illustrates a system configured to provide a videogame to one or more players, in accordance with one or more implementations of the invention.

FIG. 1 illustrates a system 10 configured to provide a videogame to one or more players. The videogame may include a vehicular racing game. The videogame may involve a series of different virtual geographic locations at which players perform activities. A group of players may be associated with each location. The players may include virtual players controlled by artificial intelligence and one or more real players controlled by real world users. Players may progress through the videogame by moving from location to location, performing objectives at the various locations, and interacting with the players at the locations.

Access to all of the different locations may not be provided initially to a real player. In some implementations, locations may be associated with predetermined criteria. The real player may be provided with a given location once the real player has fulfilled the predetermined criteria associated with the given location. The criteria may include the performance of tasks and/or the successful completion of events at one or more locations open to the real player. This may provide the real player some flexibility with respect to manner in which the real player experiences and/or interacts with the content within the videogame.

For illustrative reasons, system 10 and its associated methods are described below, in some cases, with respect to a vehicular racing game. This is not intended to be limiting. The principles disclosed herein may be adapted to a variety of other videogame genres, including without limitation, shooters, fighting games, sports games, real-time strategy games, role playing games, and/or other genres.

The system 10 may include a game platform 12 configured to execute one or more computer program modules to generate sensory stimulation for the one or more players that is associated with the videogame. For example, game platform 12 may control the generation of visual stimulation (e.g., video), audio stimulation, tactile stimulation, and/or other stimulation for one or more real players. To control the generation of this sensory stimulation, game platform 12 may include and/or control one or more of an electronic display, at least one speaker, and/or other devices. The real players may input control information to game platform 12 via one or more control peripherals 14. The game platform 12 may include a gaming console, a portable gaming console, a personal computer, a handheld device, a mobile communications device, and/or other processing platforms.

The game platform 12 may be operatively linked to one or more server 16. The game platform 12 may communicate with server 16 to enable communication between game platform 12 and other game platforms (e.g., to enable multiplayer modes), to enable software updates of the modules implemented by game platform 12 to provide the videogame, and/ or for other purposes. For example, server 16 may support a social network that is integrated into the videogame, as described in U.S. patent application Ser. No. 12/390,272, entitled "Social Network System and Method For Use With and Integration into a Video Game," and filed Feb. 20, 2009, which is hereby incorporated by reference into this disclosure in its entirety.

The one or more computer program modules implemented by game platform 12 may include a game module 18, a location module 20, an event module 22, a virtual player control module 24, and/or other modules. The computer program modules 18, 20, 22, 24, and/or other modules may include one or more modules implemented as a software module, a hardware module, a firmware module, and or a module formed from a combination of software, hardware, and/or firmware. The attribution of specific functions to particular ones of modules 18, 20, 22, and 24 within this disclosure should not be viewed as illustrative and not limiting. The functionality described herein may be performed by other combinations of modules and/or by a variety of different configurations of processors and/or modules.

The game module 18 may be configured to control game platform 12 to generate a display, sounds, and/or haptic stimulation for the player that mimics the visual, audio, and/ or tactile stimulus experienced by real players during the videogame. For example, if the videogame is a racing videogame, game module 18 may be configured to control the generation of sensory stimulation that mimics the sensory stimulation experienced during vehicular racing in real life. As such, game module 18 may include a physics engine, a rendering engine, and/or other information, instructions, and/ or modules configured to generate the sensory stimulation associated with the videogame.

The location module 20 may be configured to manage the separate virtual geographic locations within the videogame. As used herein, the term "location" may refer to virtual locations depicted within the videogame as separate geographic locations. The different locations may based on and/or modeled after real world geographic locations. A location within the videogame modeled after a real world geographic location may include landmarks that are the same as or similar to real world landmarks of the real world geographic location, terrain that is similar to the real world geographic location, flora and/or fauna similar to the real world geographic location, and/or depict other features of the virtual location that are similar to the real features of the real world location. One or more locations may be purely fictional, or based on an aggregation of a plurality of real world geographic locations.

The location module 20 may store, organize, and/or manage information that enables game module 18 to render scenes associated with the separate locations, generate sensory stimulation associated with events (e.g., races) that occur at the separate locations, and/or other information related to the locations. Location module 20 may store, organize, and/or manage information related to associations between individual locations and groups of virtual players that are associated with the individual locations.

As was mentioned above, a real player that begins the videogame may not be provided with access to all of the virtual geographic locations. Locations that are not initially available to the real player may be unlocked for, or made accessible to, the real player upon the fulfillment of predetermined criteria associated with individual ones of the locked, or inaccessible, locations. The predetermined criteria may include the performance of tasks and/or successful participation in events within one or more locations that are unlocked for the real player. The location module 20 may monitor the activities of the real player within the videogame to determine whether the real player has fulfilled the predetermined criteria associated with one or more locked locations. If the real player has fulfilled such predetermined criteria, the location module may unlock the appropriate locations to provide the real player with access.

Figure 2:
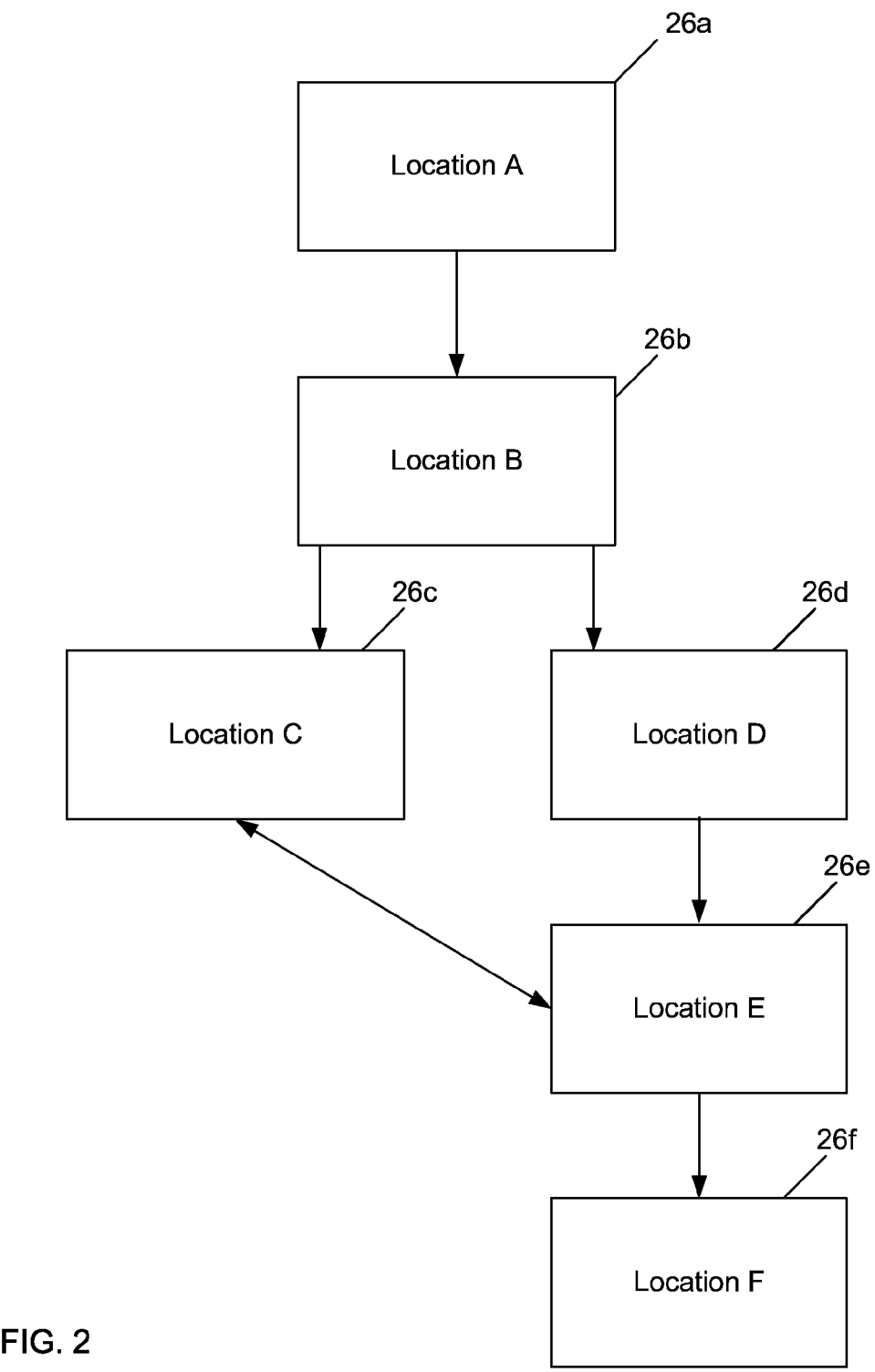
FIG. 2 is a diagram illustrating a flow of a videogame between a plurality of locations, according to one or more implementations of the invention.

By way of example, FIG. 2 shows a diagram illustrating the flow of the videogame between a plurality of locations 26 (illustrated in FIG. 2 as locations 26a, 26b, 26c, 26d, 26e, and 26f). The arrows in FIG. 2 represent the order in which locations 26 are unlocked. Within the videogame, a player may move back and forth between locations 26 (provided once the locations are unlocked) against the grain of the arrows (e.g., from location 26b to location 26a) and/or between locations 26 that are not linked by arrows in FIG. 2 (e.g., from location 26d to location 26a).

The predetermined criteria associated with a given location 26 may include performance of tasks and/or successful participation in events at the location 26 from which access to the given location is obtained. For example, the predetermined criteria associated with location 26d may include the performance of tasks and/or successful participation in events at location 26b. The predetermined criteria associated with a given location 26 may include performance of tasks and/or successful participation in events at a plurality of locations 26 accessible to the player prior to the given location 26. By way of example, the predetermined criteria associated with location 26d may include the performance of tasks and/or successful participation in events at locations 26b and 26a.

The configuration of locations 26 within the game illustrated in FIG. 2 generally provides a map of the manner in which content within the videogame is made accessible to real players. For example, a real player may be initially be given access to only a single, initial location, such as location 26a, and may proceed to unlock other ones of locations 26 by fulfilling the criteria associated with the locked locations 26b-26f. The location module (e.g., location module 20) managing locations 26 may be configured to provide real users with some control over the manner in which they access the locations 26. For example, within locations 26a and/or 26b, a real player may fulfill criteria associated with either (or both) of locations 26c and 26d. Similarly, various locations 26 may be unlocked by different sets of criteria. For example, the real player may fulfill a set of criteria associated with location 26c that includes the performance of tasks and/or successful participation in events within location 26b, or an at least partially separate set of criteria that includes the performance of tasks and/or successful participation in events within location 26e. The location module may define a plurality of different possible paths through the videogame to unlock the various locations 26.

The division of the content of videogame into the different locations may enhance the realism of the videogame, and/or may provide real players with some control over the narrative of the overall game. By way of non-limiting example, the division of content into separate geographic locations may mimic the manner in which underground, unsanctioned racing might occur in the real world (e.g., localized racing scenes along predetermined roadway courses). For instance, the videogame may progress from rural, unpopulated racecourses where interference from bystander traffic and/or law enforcement would be unusual to more metropolitan locations where spectators and racers appear unannounced en masse to block off roadways and create racecourses may mimic the viral manner in which information and interests spread in the modern world.

For example, location 26a may include an initial location available to real players that includes stretches of road that are largely unused (e.g., a remote, sparsely populated area), thereby lending themselves to informal races between friends. The races conducted by at location 26a may make for exciting videos (e.g., machinima of races participated in by the real player at location 26a), and the videogame may include players making and selecting video footage for dissemination over the Internet (within the videogame). Once the video footage of the initial location reaches a wider virtual audience within the game, word spreads and the racing scene begins grow.

Inspired by video from location 26a, rival racing hotspots (e.g., locations 26b-26f) begin to emerge. These rival locations 26b-26f may include, at first, areas that are geographically close to the initial location 26a, and then become more and more distant. Players may travel from location 26 to location 26 in order to prove themselves within local communities (e.g., the groups of players) at the individual locations 26, and/or to the national or international community as a whole (players from all of locations 26).

As the videogame progresses, the locations 26 that become accessible to a player may be less isolated. For example, locations 26e and 26f may be more heavily populated, metropolitan locations than locations 26a and 26b. The races held at these more metropolitan locations may be more notorious than the isolated races at the initial location.

As was mentioned above, FIG. 2 illustrates the manner in which a player may somewhat control the manner in which the various locations are unlocked within the videogame. This may enable the player to determine his own "career path" within the game (e.g., through the general story arc outlined above). The open-ended manner in which the content associated with the different locations is accessed may be enhanced by enabling the player to unlock other locations without completing the location he is currently participating in. For example, within the context of FIG. 2, the player participating in the videogame at location 26a may unlock location 26b without completing location 26a. At which point, the player may opt to switch locations and begin to interact with the content associated with location 26b without completing location 26a. The player may return to location 26a at his discretion to complete the content associated therewith.

As used herein, a player may be considered to have "completed" a location by successfully performing one or more final tasks and/or events. Completion of a location does not necessarily refer to the performance of all possible tasks and/or events, or even all of the tasks and/or events that can be participated in to move the plot of the videogame along.

One the predetermined criteria associated with the individual ones of locations 26 may include a threshold number of unlocked, incomplete locations. If the number of locations 26 that are unlocked and incomplete for a player exceed the threshold, the location module managing locations 26 may not unlock additional ones of locations 26 even if the other predetermined criteria associated with the additional one of locations 26 have been fulfilled. For instance, if the threshold number of unlocked, incomplete locations is 3, and each of locations 26a, 26b, and 26c are unlocked and incomplete, the location module managing location 26 may not unlock locations 26d and/or 26e even if the predetermined criteria associated with locations 26d and/or 26e are fulfilled. Instead, the location module may retain locations 26d and/or 26e as locked until one of locations 26a, 26b, or 26c are completed.

Referring back to FIG. 1, the event module 22 may be configured to manage the events within the videogame at the various locations. This may include storing the requirements of the events for success, providing the player access to previously locked events at a location, and monitoring the performance of the player within events to determine if the player has been successful. If the videogame is a racing game, the events may include vehicular racing competitions and/or other demonstrations of driving skills.

At a given location, the videogame may include a plurality of events. Each event may include a race, or some other competitive demonstration of racing skill(s). When a player first accesses a location, a preliminary set of the events at the location may be accessible to the player. The preliminary set of events may be a subset of the events associated with the location. To gain access the other events associated with the location, the player may have to fulfill predetermined criteria associated with the other events. The predetermined criteria may include, for example, successful performance of one or more of the preliminary set of events.

Successful performance in an event may or may not include "winning" an event. In addition to, or instead of, winning an event, successful performance in an event may require achieving one or more predetermined goals in the event. As non-limiting examples, the goals may include one or more of:

1. Beat player X;
2. Finish better than X place;
3. Cause X damage to Y player;
4. Get a lap time faster than X;
5. Do a jump at least X distance Y amount of times;
6. Finish with less than X amount of damage;
7. Finish in less than X time;
8. Earn X amount of points, experience points, and/or virtual currency;
9. Finish without receiving a repair;
10. Finish without using a special ability;
11. Overtake X players using a single nitro boost;
12. Finish race with at least X amount of damage;
13. Overtake driver X at least Y times;
14. Do a slide of X distance Y amount of times;
15. Ensure driver X finishes above (or below) Y place;
16. Hit a speed of X;
17. Remain below a speed of X; and
18. Use alternate route X.

Figure 3:
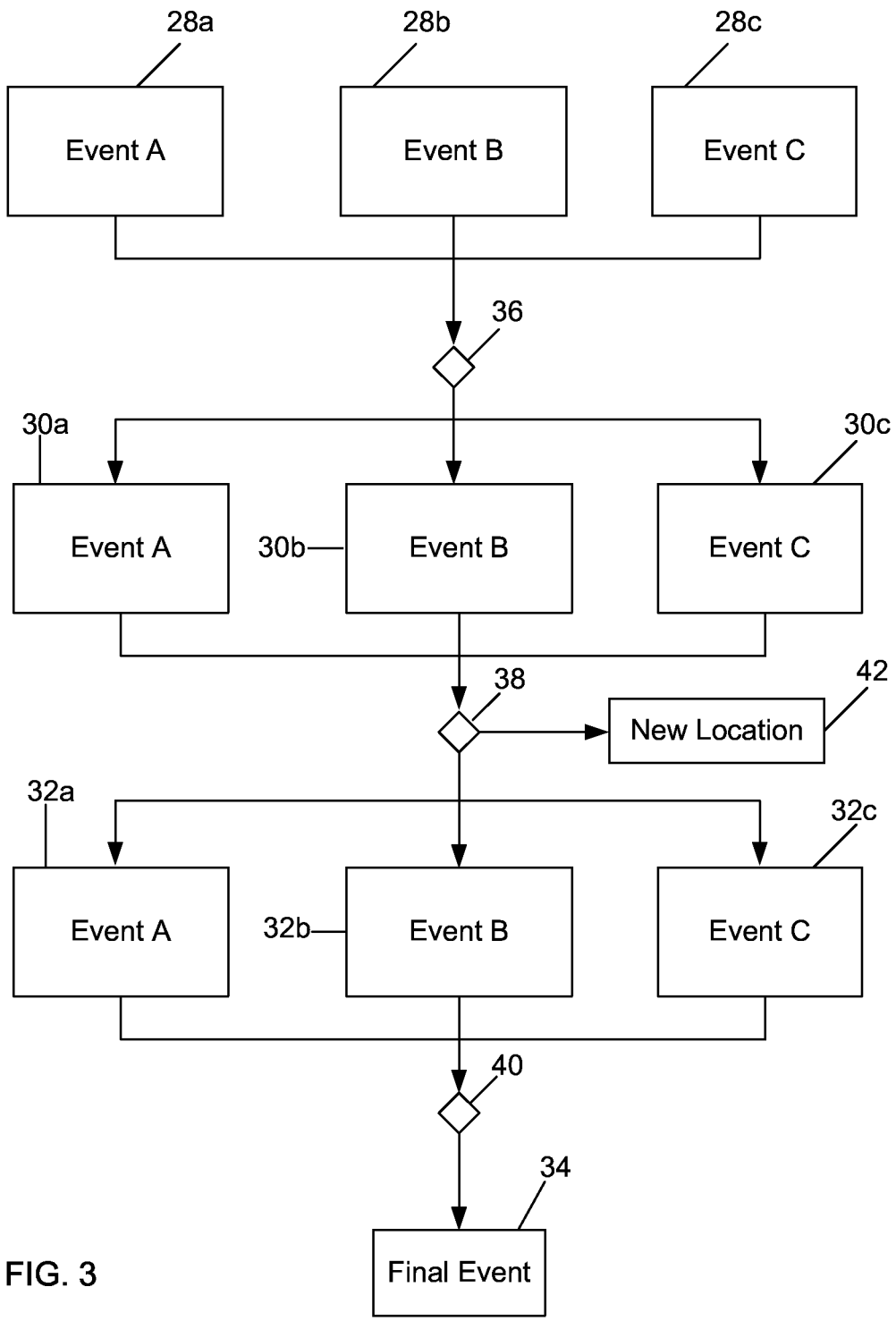
FIG. 3 is a diagram illustrating a flow of a videogame between a plurality of events associated with a location, in accordance with one or more implementations of the invention.

FIG. 3 shows a diagram illustrating the flow of the videogame between events associated with a single location within the videogame. The events may include an initial set of events 28 (illustrated in FIG. 3 as events 28*a*, 28*b*, and 28*c*), a second set of events 30 (illustrated in FIG. 3 as events 30*a*, 30*b*, and 30*c*), a third set of events 32 (illustrated in FIG. 3 as events 32*a*, 32*b*, and 32*c*), and a final event 34.

Upon gaining access to the location, a player may only have access to the initial set of events 28. In order to gain access to the second set of events 30, the event module (e.g., event module 22 in FIG. 1) managing the events shown in FIG. 3 may require the player to fulfill criteria associated with the second set of events 32. Block 36 may represent the functionality of the event module in determining whether the player has fulfilled the criteria associated with the second set of events 30. For example, the criteria associated with the second set of events 30 may include performing successfully in 2 of the 3 of events 28*a*, 28*b*, and 28*c*.

Similarly, upon fulfilling the criteria associated with the second set of events 30, the player may not be provided with access to the third set of events 32 until the event module determines that the player has fulfilled criteria associated with the third set of events 32. For example, block 38 may represent the event module determining whether the player has performed successfully in 2 of 3 of events 30*a*, 30*b*, and 30*c*. Then, to gain access to final event 34, the player may be required to participate in events 30 to fulfill criteria associated with final event 34. For example, block 40 may represent the event module determining whether the player has performed successfully in 2 of 3 of events 32*a*, 32*b*, and 32*c* before providing the player with access to final event 34.

The event module managing the events show in FIG. 3 may not dictate to the player the order in which the player performs events within a given set. Since not all of the events at a given level may be required for the event module to provide access to a next set of events (or event), the event module may not dictate to the player which portion of the content within the game the player must access in the course of successfully accomplishing the videogame. This may enhance the gaming experience with the videogame, as players may control to some extent the order in which videogame content is experienced, and the particular tasks that are performed that contribute to finishing the videogame. While conventional videogame systems, such as videogame systems providing vehicular racing videogames, may provide content with tasks and/or events that are optional, players typically progress through the game toward completion by completing all of a predetermined set of "plot moving" tasks and/or events, in addition to interactions with the optional content.

To complete the location associated with events 28, 30, 32, and 34, a location module managing the location may require a player to successfully participate in final event 34. Within the narrative of the videogame, completing final event 34 of the location may be commemorated with a special reward or incentive. The special reward or incentive may include, for example, a bonus of points, experience points, and/or virtual currency. The special reward may include, for example, an insignia, a badge, or a patch that can be worn on a representation of the player or a representation of a car driven by the player indicating that the player has completed the location. Completion of all the locations, or some predetermined number of the locations, by completing the final events at the locations may be required before the grand finale of the videogame is accessible to the player.

As was mentioned above, the location module may not require the player to complete the location before providing the player with access to another location. By way of illustration, in addition to the functionality discussed above, block 38 may represent a determination by the location module of whether the player has fulfilled criteria associated with another location. If the player has fulfilled such criteria, the location module may provide access to the other location in an operation illustrated at block 42. The criteria associated with the other location may include the performance of tasks and/or events at the location illustrated in FIG. 3. The criteria may include the same criteria associated with unlocking events 32 (e.g., successful participation in 2 of the 3 of events 30*a*, 30*b*, and 30*c*), and/or other criteria.

The virtual player control module 24 may be configured to control the virtual players within the game. As such, virtual player control module 24 may include artificial intelligence that controls the actions of virtual players within the game. The virtual players may include players that real players compete against in the videogame (e.g., in events), characters that observer or facilitate the events in the videogame (e.g., spectators, equipment or vehicle vendors, mechanics). The virtual player control module 24 may control the actions of the virtual players in the events within the game, in other contexts within the game, and/or other interactions of the virtual players with real players.

The interactions of the virtual players with a real player may be influenced by relationships of the real player with the different virtual players. The relationships may be dynamically and adaptively determined by virtual player control module 24 (e.g., they can change automatically over time). For example, the relationships may be determined based on interactions between the real player and the virtual players within the videogame (and/or outside of the videogame). Interactions toward a virtual player by the real player that are hostile or aggressive may result in the virtual player having a hostile or combative disposition or attitude toward the player.

Similarly, interactions toward a virtual player by the real player that are felicitous may result in the virtual player having a friendly or cooperative disposition or attitude toward the real player.

The relationships between virtual players and the real player may impact the videogame in that virtual players that are friendly or cooperative toward the real player may help the real player be successful in completing events, while virtual players that are hostile toward the real player may actively hinder the real player from being successful in events.

In order to control virtual players based on the relationships between the virtual players and real players, the virtual player control module 24 may determine the attitude and/or disposition of individual virtual players to individual real players. To accomplish this, an overarching disposition mode may be assigned by virtual player control module 24 to the relationship between a real player and a given virtual player based on their interactions. Non-limiting examples of the possible overarching disposition modes including friend, rival, and/or neutral.

The status of relationships between the virtual players and a real player may be conveyed to the real player. The status may be conveyed to the real player, for example, via a visual and/or audio indicator provided to the real player in the game.

The virtual player control module 24 may switch individual virtual player behaviors toward a real member by a given virtual member on or off based on the disposition mode determined for the relationship between the real player and the given virtual player, and a predetermined profile established for the given virtual player. For instance, for a first disposition mode, the predetermined profile for the given virtual player may dictate that behaviors A, B, and C may be switched on while behaviors D, E, and F may be switched off. If virtual player control module 24 determines that the relationship between the real player and the given virtual player has changed to a second disposition mode, the predetermined profile may dictate that one or more of behaviors A, B, and C be switched off and/or one or more behaviors D, E, and F be switched on.

Behaviors that may be switched on and/or off by virtual player control module 24 in accordance with predetermined profiles of virtual players may include on the racetrack moves that are intended to help or hinder real players. For example, such behaviors may include one or more of blocking, sideswiping, ramming from behind, braking with a real member behind, allowing a pass, drafting, allowing drafting, overtaking, and/or other behaviors.

Virtual players may be the keepers of information related to events and/or locations. This information may unlock events and/or locations, or may provide guidance to the real player as to how to be successful within the context of an event or location. If the real player has a hostile relationship with a virtual player that is the keeper of information related to an event or location, the virtual player may withhold the information. If the real player has a friendly relationship with a virtual player that is the keeper of information related to an event or location, the virtual player may provide the information to the real player. The real player may then implement the information to access the previously locked content, be successful at an event or location, or otherwise implement the information.

Each location within the videogame may have a group of virtual players that are associated therewith. The group of virtual players associated with a given location may have one or more traits that are consistent with the virtual geographic setting of the given location, the place in the narrative of the videogame of the location, and/or other features of the given location. For example, in locations that are accessible to a real player early in the narrative of the racing game described above, the groups of virtual players may include tightly knit groups of friends that convene to race in remote, isolated locales for the thrill and adrenaline rush. However, as the real player proceeds through the videogame to locations that are cosmopolitan, the publicity, acclaim and rewards associated with the covert racing provided by the videogame may become more prevalent. As such, the virtual players associated with these locations may be have different motivations than the virtual players experienced early on in the game, and may be less friendly and more aggressive. Similarly, racing tactics employed by the virtual players associated with later locations may be more cutthroat and dangerous.

The groups of virtual players associated with the locations within the game may each have its own social structure. Players, including virtual and real players, may move up and down in status within the group based on one or more of their performance within events, their virtual possessions, their relationships (e.g., friendships and rivalries), and/or other socially significant acts, items, and/or traits. The virtual player control module 24 may determine the relative status of the players associated with a given location, including a real player playing the videogame and the virtual players associated with the given location.

Progression through the videogame by unlocking content at a location may require more than success in the events associated with the location. Unlocking content at the location (e.g., the criteria associated with locked events and/or locations) may require a real player to progress socially within the group of virtual players associated with the location. In some cases, to complete a location a real player much increase status within the group until the player is the "leader" of the group.

The group of virtual players associated with a location within the videogame may include different types of virtual players. These types of virtual players may include a boss type of virtual player, a nemesis type of virtual player, and/or other types of virtual players. A boss type of virtual player may be the leader of the group. Completion of a location may require the real player to defeat the boss virtual player of the location in the final event of the location. A nemesis type of virtual player may include a virtual player within the group that is attempting to perform the same set of tasks as the real player, and competes directly with the real player throughout the events associated with the location. The nemesis may also compete for resources at the location (e.g., cars, equipment, friendships with other characters) with the real player. Success within one or more events at the location may be judged based on performance relative to the nemesis real player at the location.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a player with a videogame, the system comprising:

a game platform configured to implement one or more computer program modules to provide a player with the videogame, the one or more computer program modules comprising:

a content module configured to manage multiple sets of content within the videogame, wherein the multiple sets of content within the videogame comprise a first content set that is accessible to the player engaging in the videogame and a second content set that is not accessible to the player initially within the videogame, wherein the second content set is associated with a first set of criteria, wherein the content module is configured to unlock the second content set within the videogame for the player to enable the player to access the second content set within the videogame responsive to the player fulfilling the first set of criteria, wherein the first set of criteria includes performance of one or more tasks provided by the first content set that are not sufficient to pass the first content set, successful participation in one or more events associated with the first content set, and achieving a first disposition mode for a social relationship between the player and one or more virtual players in the videogame, and wherein the first content set and the second content set must be passed to complete the videogame; and an event module configured to manage a first set of events associated with the first content set, and to determine if the player has successfully participated in individual events in the first set of events, and wherein the first set of criteria associated with the first content set requires successful performance of some subset of the first set of events as determined by the event module.

2. The system of claim 1, wherein the first set of events includes a final event associated with a second set of criteria, wherein the event module locks the final event for the player until the second set of criteria are fulfilled, wherein the second set of criteria requires successful performance of some subset of the first set of events as determined by the event module, wherein successful participation in the final event is required to pass the first content set, and wherein the first set of criteria can be fulfilled by the player within the first content set prior to fulfilling the second set of criteria.

3. The system of claim 1, wherein the content module is configured such that unlocking the second content the videogame enables the player to interact with the videogame content associated with the second content set, and wherein the content module enables the player, once the second content set has been unlocked, to participate in at least one event associated with the second content set without passing the first content set and then to participate in at least one event associated with the first content set without passing the second content set.

4. A system configured to provide a player with a videogame, the system comprising:

a game platform configured to implement one or more computer program modules to provide a player with a videogame, the one or more computer program modules comprising:

a content module configured to manage multiple sets of content within the videogame, wherein the multiple sets of content within the videogame comprise a first content set that is accessible to the player engaging in the videogame and a second content set that is not accessible to the player initially within the videogame, wherein the second content set is associated with a first set of criteria, wherein the content module is configured to unlock the second content set within the videogame for the player to enable the player to access the second content set within the videogame responsive to the player fulfilling the first set of criteria, wherein the first set of criteria includes performance of one or more tasks provided by the first content set that are not sufficient to pass the first content set, successful participation in one or more events associated with the first content set, and achieving a first disposition mode for a social relationship between the player and one or more virtual players in the videogame, and wherein the first content set and the second content set must be passed to complete the videogame; and a virtual player control module configured to implement artificial intelligence to control a plurality of virtual players within the videogame including a first group of virtual players associated with the first content set and a second group of virtual players, separate from the first group of virtual players, associated with the second content set.

5. The system of claim 4, wherein the virtual player control module is further configured to determine relative social statuses of the plurality of virtual players within the first group of the virtual players and relative social statuses of the virtual players within the second group of virtual players, and to determine the relative social status of the player within the first group of virtual players and the relative social status of the player within the second group of virtual players.

6. The system of claim 5, wherein the virtual player control module is further configured to dynamically and adaptively determine disposition modes of relationships between the plurality of virtual players in the first group of virtual players and the player based on interactions between the player and the virtual players, and wherein social status of the player within the first group of virtual players depends on the disposition modes of the relationships between the virtual players in the first group of virtual players and the player.

7. The system of claim 4, wherein the first group of virtual players includes virtual players that the player competes with within the first content set and the second group of virtual players includes virtual players that the player competes against within the second content set.

8. The system of claim 5, wherein the virtual player control module is further configured to dynamically and adaptively determine disposition modes of the relationships between the plurality of virtual players in the first group of virtual players and the player based on interactions between the player and the virtual players.

9. A computer-implemented method for providing a player with videogame, the method being implemented in a computer system comprising one or more processors, the method comprising:

executing, on the one or more processors, one or more computer program modules to provide the videogame, the one or more computer program modules, when executed by the one or more processors, resulting in:

providing a player access to a first content set within the videogame;

monitoring performance of the player within the first content set;

comparing the performance of the player within the first content set with a first set of criteria to determine if the player has fulfilled the first set of criteria, the first set of criteria including performance of one or more tasks in the first content set, successful participation in one or more events associated with the first content set, and achieving a first disposition mode for a social relationship between the player and one or more virtual players in the videogame, wherein fulfilling the first set of criteria is not sufficient to pass the first content set, and wherein completing the videogame requires the player to pass the first content set;

unlocking a second content set for the player by making the second content set accessible to the player responsive to the first set of criteria being determined fulfilled, wherein completing the videogame requires the player to pass the second content set; and implementing artificial intelligence to control a plurality of virtual players within the videogame including a first group of virtual players associated with the first content set and a second group of virtual players, separate from the first group of virtual players, associated with the second content set.

10. The method of claim 9, wherein providing the player access to the first content set comprises enabling the player to participate in one or more of a first set of events associated with the first content set, wherein monitoring performance of the player within the first content set comprises determining if the player has successfully participated in individual events in the first set of events, and wherein fulfilling the first set of criteria requires successful participation in some subset of the first set of events.

11. The method of claim 10, wherein the first set of events includes a final event associated with a second set of criteria, the method further comprising unlocking the final event for the player by making the final event accessible to the player if the second set of criteria is determined to have been fulfilled, wherein the first set of criteria can be fulfilled by the player within the first content set prior to fulfilling the second set of criteria, and wherein the final event is required to pass the first content set.

12. The method of claim 9, wherein making the second content set accessible to the player comprises enabling the player to participate in at least one event associated with the second content set, and wherein the method comprises:

enabling the player to participate in at least one event associated with content set prior to the player passing the first content set; and subsequent to enabling the player to participate in at least one event associated with the second content set, enabling the player to participate in at least one event associated with the first content set prior to the player passing the second content set.

13. The method of claim 9, further comprising:

determining relative social statuses of the plurality of virtual players within the first group of the virtual players;

determining relative social statuses of the plurality of virtual players within the second group of virtual players;

determining relative social status of the player within the first group of virtual players; and determining relative social status of the player within the second group of virtual players.

14. The method of claim 13, further comprising dynamically and adaptively determining disposition modes of relationships between the plurality of virtual players in the first group of virtual players and the player based on interactions between the player and the virtual players, wherein the relative social status of the player within the first group of virtual players depends on the disposition modes of the relationships between the virtual players in the first group of virtual players and the player.

15. The method of claim 9, wherein the first group of virtual players includes virtual players that the player competes with within the first content set and the second group of virtual players includes virtual players that the player competes against within the second content set.

16. The method of claim 9, further comprising dynamically and adaptively determining disposition modules of relationships between the virtual players in the first group of virtual players and the player based on interactions between the player and the virtual players.

* * * * *